(12) United States Patent
Xiong et al.

(10) Patent No.: US 11,496,671 B2
(45) Date of Patent: Nov. 8, 2022

(54) SURVEILLANCE VIDEO STREAMS WITH EMBEDDED OBJECT DATA

(71) Applicant: Western Digital Technologies, Inc., San Jose, CA (US)

(72) Inventors: Shaomin Xiong, Newark, CA (US); Toshiki Hirano, San Jose, CA (US); Qian Zhong, Santa Clara, CA (US); Haoyu Wu, Sunnyvale, CA (US); David Berman, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,786

(22) Filed: Feb. 19, 2021

(65) Prior Publication Data

US 2022/0272255 A1  Aug. 25, 2022

(51) Int. Cl.
*H04N 5/232* (2006.01)
*H04N 7/18* (2006.01)
*G06T 7/70* (2017.01)

(52) U.S. Cl.
CPC .......... *H04N 5/23219* (2013.01); *G06T 7/70* (2017.01); *H04N 5/23296* (2013.01); *H04N 5/23299* (2018.08); *H04N 7/181* (2013.01)

(58) Field of Classification Search
None
See application file for complete search history.

(56) References Cited

U.S. PATENT DOCUMENTS

| 10,043,079 | B2 | 8/2018 | Kim et al. |
| 2013/0021434 | A1 | 1/2013 | Ahiska |
| 2013/0107214 | A1 | 5/2013 | Blixt et al. |
| 2013/0271598 | A1* | 10/2013 | Mariadoss ....... H04N 21/64322 348/207.1 |
| 2013/0322687 | A1* | 12/2013 | Kritt ....................... G06V 20/52 382/103 |
| 2017/0034572 | A1 | 2/2017 | Marlatt et al. |
| 2018/0005045 | A1 | 1/2018 | Kawano |
| 2018/0157939 | A1 | 6/2018 | Butt et al. |
| 2018/0262724 | A1* | 9/2018 | Ross ....................... G06V 20/40 |
| 2018/0336687 | A1* | 11/2018 | Mudretsov ......... H04N 5/23219 |
| 2019/0325559 | A1 | 10/2019 | Hsu et al. |
| 2020/0257892 | A1 | 8/2020 | Agarwal et al. |

FOREIGN PATENT DOCUMENTS

EP  1179958  8/2012

OTHER PUBLICATIONS

International Search Report and Written Opinion for International Application No. PCT/US2021/031984, dated Nov. 9, 2021, 9 pgs.

* cited by examiner

*Primary Examiner* — James M Anderson, II
(74) *Attorney, Agent, or Firm* — Patent Law Works LLP

(57) ABSTRACT

Systems and methods for surveillance video streams with embedded object data from another video camera are described. At least two video cameras are configured with fields of view to provide images of an object from alternative views. Video data for a primary video stream is received from one camera and secondary object data for the object from the other camera is embedded in the primary video stream. The primary video stream is sent to an analytics engine for processing the primary video and embedded secondary object data, such as performing facial recognition on a better image of a human face and/or feature vectors therefrom that are embedded in the primary video stream.

20 Claims, 7 Drawing Sheets

SURVEILLANCE VIDEO STREAMS WITH EMBEDDED OBJECT DATA

TECHNICAL FIELD

The present disclosure generally relates to video surveillance systems and, more particularly, to video surveillance systems for display and analysis of object data for object recognition.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance applications use object recognition, such as facial recognition, based on discrete objects identified in a video stream. In some applications, multiple cameras may be positioned to provide a plurality of views and corresponding video streams in a common area. For example, a lobby, parking area, or building entrance may include a plurality of cameras positioned in different locations to provide multiple and overlapping angles and fields of view. In some configurations, one or more cameras may include zoom and/or pan-tilt-zoom (PTZ) capabilities for adjusting their magnification, field of view, and/or objects of interest during video capture, based on manual control and/or automated detection and PTZ control algorithms.

While the use of multiple cameras and angles for viewing and analyzing the same scene or object may be advantageous for analysis, such as recognition algorithms, it may be taxing on the video data transfer and storage systems. For example, receiving two data streams of the same scene from different angles may effectively double both the data transfer and data storage requirements for the system and location. Additionally, it may be advantageous to add a second camera and associated view to an existing system, where additional network bandwidth is not available for the added video data stream.

Systems and methods for selectively delivering relevant video data content without requiring an additional video stream may be advantageous. A reliable and efficient way of selectively embedding video data from a second video stream into a first video stream may be needed.

SUMMARY

Various aspects for surveillance video streams with embedded object data, particularly video object data captured by another camera, are described.

One general aspect includes a that includes a first video camera and a second video camera, where the second video camera is configured to provide an alternative view of an object in a field of view of the first video camera. The system also include a controller configured to: receive video data from the first video camera; receive video data from the second video camera; determine a first image of an object in the video data from the first video camera; determine, based on the video data from the first video camera, a primary video stream; embed, based on a second image of the object from the second video camera, secondary object data in the primary video stream; and send the primary video stream to an analytics engine for processing the secondary object data.

Implementations may include one or more of the following features. The controller may be further configured to: determine, for the first image of the object, an object quality metric; and initiate, responsive to the object quality metric for the first image of the object failing an object quality threshold, the second video camera to capture the video data from the second video camera. The controller may be further configured to: determine a location of the object in a field of view of the second video camera; and send, responsive to the object quality metric for the first image of the object failing the object quality threshold, a pan-tilt-zoom position control signal to the second video camera to adjust the alternative view of the object for the second image of the object. The controller may be further configured to: determine, in the video data from the second video camera, an object boundary for the object; and select, based on the object boundary for the object in the video data from the second video camera, the secondary object data to include object image data within the object boundary. The controller may be further configured to determine, based on the video data from the second video camera, a set of object feature data for use in object recognition and the secondary object data may include the set of object feature data. The object may be a human face, the set of object feature data may include a set of feature vectors from the human face in the video data from the second video camera, and processing the secondary object data may include using a facial recognition model and the set of feature vectors to search facial reference data for recognition of the human face. The controller may be further configured to: determine, in the video data from the first video camera, an object boundary for the object; determine, in the video data from the first video camera, an embed location for the secondary object data relative to the object boundary; and encode, in the primary video stream, the secondary object data in the embed location with the video data from the first video camera. The controller may be further configured to: configure an object data embed location for embedding the secondary object data; determine, in the video data from the first video camera and based on the configured object data embed location, an embed location for the secondary object data; and selectively replace, in the embed location, video data from the first video camera with the secondary object data. The controller may be further configured to: determine a side track for the primary video stream; and embed the secondary object data in the side track of the primary video stream. The controller may be embedded in at least one of: the first video camera; and the second video camera. The system may include the analytics engine configured to: receive the primary video stream; determine an embed location for the secondary object data; extract the secondary object data; search, based on the secondary object data, object reference data for recognition of the object; and return an object recognition value for the object.

Another general aspect includes a computer-implemented method that includes: receiving first video data from a first video camera; determining a first image of an object in the first video data; receiving second video data from a second video camera, where the second video camera is configured to provide an alternative view of an object in a field of view of the first video camera; determining, based on the first video data, a primary video stream; embedding, based on a second image of the object from the second video data, secondary object data in the primary video stream; and sending the primary video stream to an analytics engine for processing the secondary object data.

Implementations may include one or more of the following features. The computer-implemented method may include: determining, for the first image of the object, an object quality metric; and initiating, responsive to the object quality metric for the first image of the object failing an object quality threshold, the second video camera to capture the second video data. The computer-implemented method may include: determining a location of the object in a field of view of the second video camera; and sending, responsive to the object quality metric for the first image of the object failing the object quality threshold, a pan-tilt-zoom position control signal to the second video camera to adjust the alternative view of the object for the second image of the object. The computer-implemented method may include: determining, in the second video data, an object boundary for the object; and selecting, based on the object boundary for the object in the second video data, the secondary object data to include object image data within the object boundary. The computer-implemented method may include determining, based on the second video data, a set of object feature data for use in object recognition, where the secondary object data includes the set of object feature data. The object may be a human face, the set of object feature data may include a set of feature vectors from the human face in the second video data, and processing the secondary object data may include using a facial recognition model and the set of feature vectors to search facial reference data for recognition of the human face. The computer-implemented method may include: determining, in the first video data, an object boundary for the object; determining, in the first video data, an embed location for the secondary object data relative to the object boundary; and encoding, in the primary video stream, the secondary object data in the embed location with the first video data. The computer-implemented method may include: configuring an object data embed location for embedding the secondary object data; determining, in the first video data and based on the configured object data embed location, an embed location for the secondary object data; and selectively replacing, in the embed location, first video data with the secondary object data. The computer-implemented method may include: receiving the primary video stream; determining an embed location for the secondary object data; extracting the secondary object data; searching, based on the secondary object data, object reference data for recognition of the object; and returning an object recognition value for the object.

Still another general aspect includes a storage system that includes: a first video camera; a second video camera, where the second video camera is configured to provide an alternative view of an object in a field of view of the first video camera; a processor; a memory; means for receiving first video data from the first video camera; means for determining a first image of an object in the first video data; means for receiving second video data from the second video camera; means for determining, based on the first video data, a primary video stream; means for embedding, based on a second image of the object from the second video data, secondary object data in the primary video stream; and means for sending the primary video stream to an analytics engine for processing the secondary object data.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve processing of video object data by embedding additional video object data from a second camera in a surveillance video stream. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
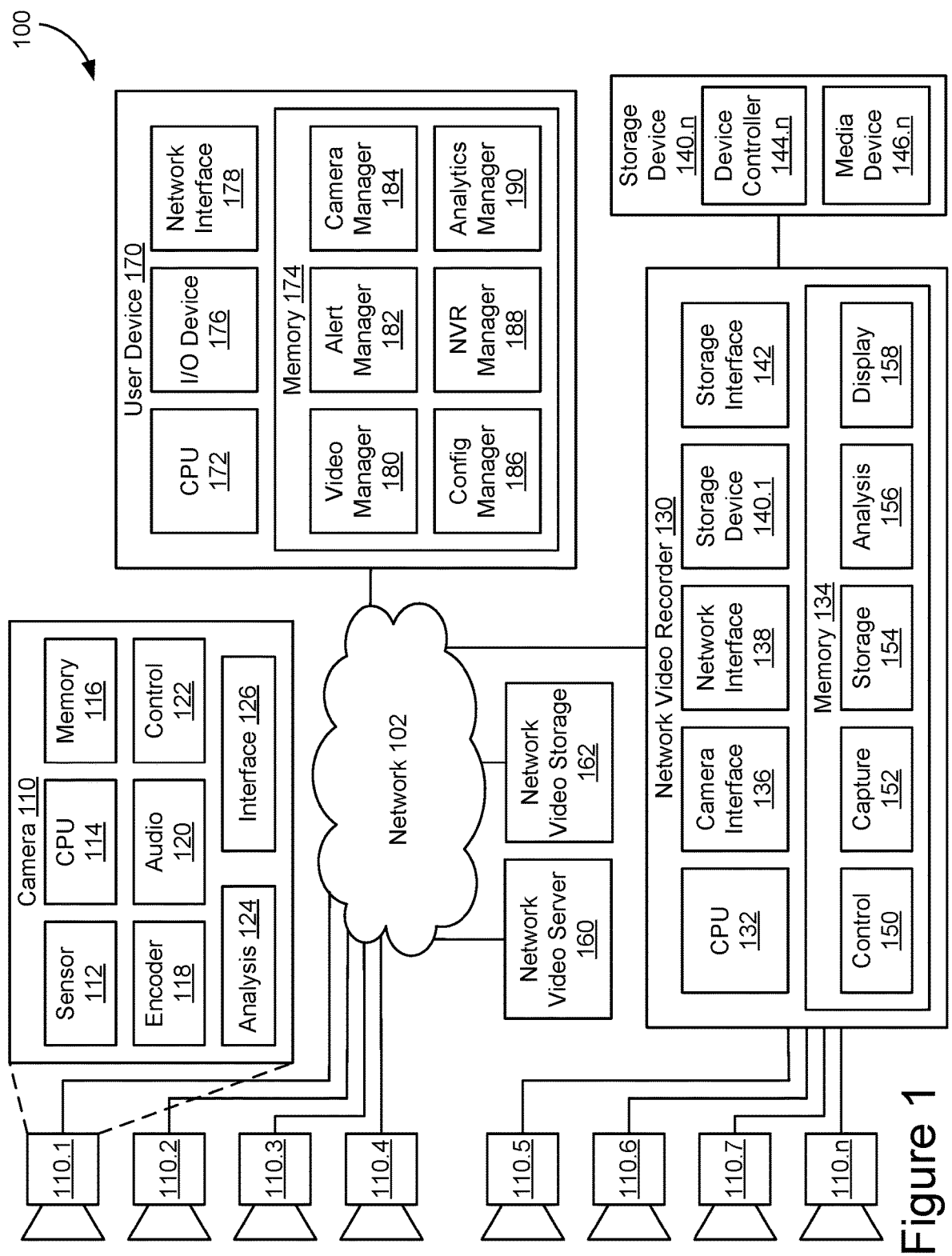
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor or central processing unit CPU 114, a memory 116, an encoder 118, an audio channel 120, a control circuit 122, and/or a network interface 126. In some embodiments, video cameras 110 may include onboard analytics, such as a video analysis subsystem 124.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. The two image sensors and associated lenses may be configured to support alternate views of an overlapping field of view and may provide primary and secondary video data as further described below. In some embodiments, multiple image sensors are supported by the same circuit board and/or processing subsystem containing CPU 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support object detection, evaluation of object image quality, and initiation of a second camera for object image capture. For example, video analysis subsystem 124 may receive a video stream (from sensor 112, encoder 118, and/or another camera 110), detect an object, calculate a quality metric for the object image, compare the quality metric to a threshold, and determine that another camera should be initiated to locate the same object from a different perspective and attempt to generate a better-quality image of the object. In some embodiments, video analysis subsystem 124 may be further configured to receive the second video data, detect and extract the object image data, and embed the object image data in the other video stream. For example, one or more aspects of detecting, extracting, and embedding object image data may be executed by the primary or secondary camera using their respective CPU 114, memory 116, encoder 118, video analysis subsystem 124, and/or other compute resources.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives. In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.$n$ may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.$n$. In some embodiments, storage interface 142 may include a wireless data connection with sufficient bandwidth for video data transfer. Depending on the configuration and protocols used by storage interface 142, storage device 140.$n$ may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received. In some embodiments, camera control subsystem 150 may manage multiple cameras 110 that include overlapping fields of view and may provide alternate views of an object within their shared fields of view. For example, two or more cameras 110 may be configured as camera pairs or groups that may supplement one another's primary video stream with additional object image data from an alternate view. In some embodiments, a supplemental camera may be added to the system and include control, capture, and analysis functions for embedding object image data in the primary data stream of one or more paired cameras.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158. In some embodiments, video capture subsystem 152 may be configured to receive a primary video stream that includes embedded object image data from one or more cameras 110 and/or receive a primary video stream and a secondary video stream to perform the detection, extraction, and embedding of object image data from the secondary video data into the primary video stream.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, use device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
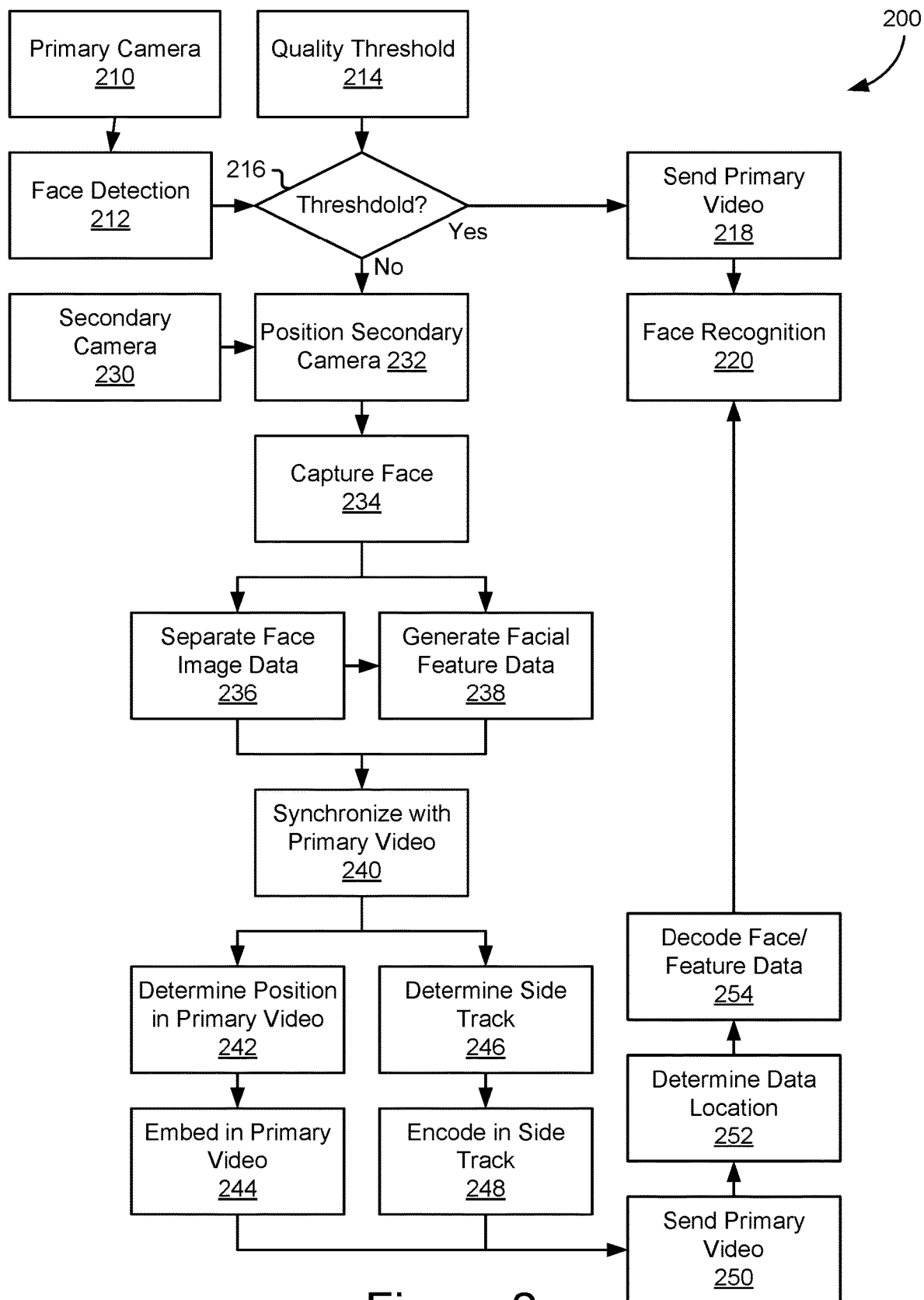
FIG. 2 schematically illustrates embedding object data from a second camera for facial recognition that may be used by the computer-based surveillance system of FIG. 1.

FIG. 2 shows a schematic representation of embedding object data from a second camera for facial recognition that may be implemented in a computer-based surveillance system 200, such as surveillance system 100 in FIG. 1. Primary camera 210, similar to cameras 110 in FIG. 1, may be configured to capture image data from light waves striking an image sensor. At block 212, face detection may detect a face from the video data generated by primary camera 210. For example, primary camera 210 may include an object detection circuit or function in a video analysis subsystem configured for human face detection.

At block 214, system 200 may include a quality threshold for evaluating the object image data to determine whether it is sufficient for subsequent analysis processing, such as facial recognition. For example, system 200 may be configured with a quality threshold value corresponding to a minimum value for an image quality metric, such as the reliability metric of the object detection model used for face detection at block 212. At block 216, whether the quality threshold is met or not may be evaluated. For example, primary camera 210 may compare an image quality metric for the detected object to the quality threshold and determine that the video image of the detected object meets the quality threshold or doesn't. If the quality threshold is met, a primary video stream may be sent at block 218. For example, primary camera 210 may encode the generated video data in a video stream and send it to a network video recorder for storage and further processing, such as running facial recognition analysis on the detected face. In some embodiments, a face detection flag or other metadata may be set and associated with the primary video stream to trigger further processing by the network video recorder or associated analytics engine. At block 220, the primary video stream may be processed for face recognition based on the face image data captured by primary camera 210, such as by generating a set of facial feature data and searching a reference datastore for known faces with similar facial feature data.

If, at block 216, the quality threshold was not met by the object image captured by primary camera 210, system 200 may initiate a process for capturing additional object image data from secondary camera 230 to include in the primary video stream from primary camera 210. At block 232, secondary camera 230 may be positioned to capture additional video data of the face detected at block 212 from an alternate view. For example, auto capture logic targeting the face detected at block 212 may be initiated to enable secondary camera 230 to generate a better-quality image of the human face. In some embodiments, the auto capture logic for secondary camera 230 may detect the same face and use PTZ control to center and zoom on the face. At block 234, the face is captured in video data from secondary camera 230. For example, video data from the alternate view, position, and zoom may include a better-quality image of the face. In some embodiments, system 200 may use the quality threshold from block 214 and/or the quality metric for the face image from primary camera 210 to evaluate the quality of the face image data from secondary camera 230. For example, system 200 may evaluate whether the quality metric for face data from secondary camera 230 exceeds the quality metric for primary camera 210 and/or the quality threshold at block 214 to determine whether it should be added to the primary video stream.

System 200 may support one or more processes for selecting object image data from secondary camera 230. At block 236, face data may be separated or extracted from the video data from the secondary camera captured at block 234. For example, a face detection algorithm may determine the position and boundaries of the image data that includes the face and the image data within the boundary may be separated from the background video data. The separated image data that includes the bounded face image may be a portion of the total video image and, therefore, contain substantially less data than the entire video data stream. System 200 may use the extracted face data as the image data to embed in the primary video stream.

At block 238, facial feature data, such as feature vectors, face templates, and/or face embeddings, may be generated from the captured face video data, directly or based on the separated face image data. For example, the face image data detected and bounded at block 236 may be processed using a feature detection or embedding algorithm or face template generator to determine a set of feature data, such as the feature vectors, face template, or face embeddings, describing the face. The feature vectors may include a series of numerical vector values in a predetermined format and/or tagged with relevant feature/value descriptors. The set of featured factor values may require substantially less data than the face image data or the entire video data stream.

At block 240, the image data, such as the face image data or the feature vectors, may be synchronized with the timing of the primary video stream from primary camera 210. For example, the image data from secondary camera 230 may be organized or configured in a time series corresponding to the frames and timing of the video data from secondary camera 230 and time markers may be used to synchronize the video data between primary camera 210 and secondary camera 230, such that image data from secondary camera 230 may be embedded in association with a substantially concurrent frame of image data in the primary data stream. In some embodiments, video data for the primary video stream may be buffered or otherwise delayed to enable the image data from secondary camera 230 to be processed, synchronized, and embedded in the primary video stream.

System 200 may support one or more processes for embedding the secondary object data from secondary camera 230 in the primary video stream from primary camera 210. At block 242, a position in the primary video may be determined. For example, system 200 may be configured with a predetermined position, such as a set of pixels grouped along an edge of the video frame or distributed across a grid of positions in a zone of the frame, within each frame of video. In another example, the set of pixels may be determined based on the location of the object in primary video stream (as detected at block 212), such as within or overlapping the object border for the face or with a predetermined offset from the object border or a point within the border. At block 244, the secondary object data from blocks 236 or 238 may be embedded in the primary video stream at the embed position determined at block 244. The embedded secondary object data may overwrite or selectively replace the pixel data from the original video and be encoded with the primary video data in accordance with the video codec being used. In some embodiments, particularly embedding object feature data, such as feature vectors, the pixel replacements may be small in number (relative to the total pixels in the frame) and/or distributed such that there is no perceptible visible difference between the original video stream and the primary video stream with the encoded image data from second camera 230.

At block 246, a side track may be determined for the primary video stream. For example, the video format used for the primary video stream may include one or more side tracks for synchronized data that is not part of the primary video frames, such as subtitle tracks, audio tracks (right channel or left channel), metadata tracks, or other synchronized data tracks supported by the video format. System 200 may be configured to use a side track that would otherwise be unused for surveillance video data, such as a subtitle track, and/or allows the secondary object data to be encoded in the side track in addition to the original side track data without impeding the original use of the side track. At block 248, the secondary object data, such as the face data from block 236 or the feature vectors from block 238, may be encoded in the side track in accordance with the video format of the primary video stream. For example, the face data or feature vectors may be stored into the side track determined at block 246 using a predetermined format that enables a receiving system to extract the data from the side track, with or without the original side track data, depending on the configuration.

At block 250, the primary video is sent to one or more destination systems or subsystems, such as a network video recorder, network video server, network video storage, user device, and/or analytics engines embodied in or associated with any of those components. In some embodiments, the primary video stream may be received by the destination system using existing network and compute resources configured for handling the primary video stream without regard for the embedded secondary object data. The destination system or subsystem may be configured to, at block 252, determine the data location for the secondary object data in the primary video stream. For example, the destination system may be configured to check the embed position determined at block 242 or the side track determined at block 246 to locate the face data and/or feature vectors. At block 254, the destination system may decode and/or extract the face image data and/or facial feature data from the embed location of the primary video stream. For example, the destination system may be configured to decode the primary video frames and use a mask or algorithm for extracting the embedded secondary object data. At block 220, the primary video stream and/or the extracted video object data may be processed for face recognition based on the face image data captured by secondary camera 230. For example, the destination system may use a face recognition algorithm to process the face data from secondary camera 230. In some embodiments, the destination system may use both the object video data in the original video data captured by primary camera 210 and the secondary object data from the secondary camera for analytical processing, such as facial recognition. In some embodiments, the destination system may be configured to use the facial feature data, such as the feature vectors, to directly search a reference data store for facial recognition without further processing or generation of facial feature data at the destination system.

Figure 3:
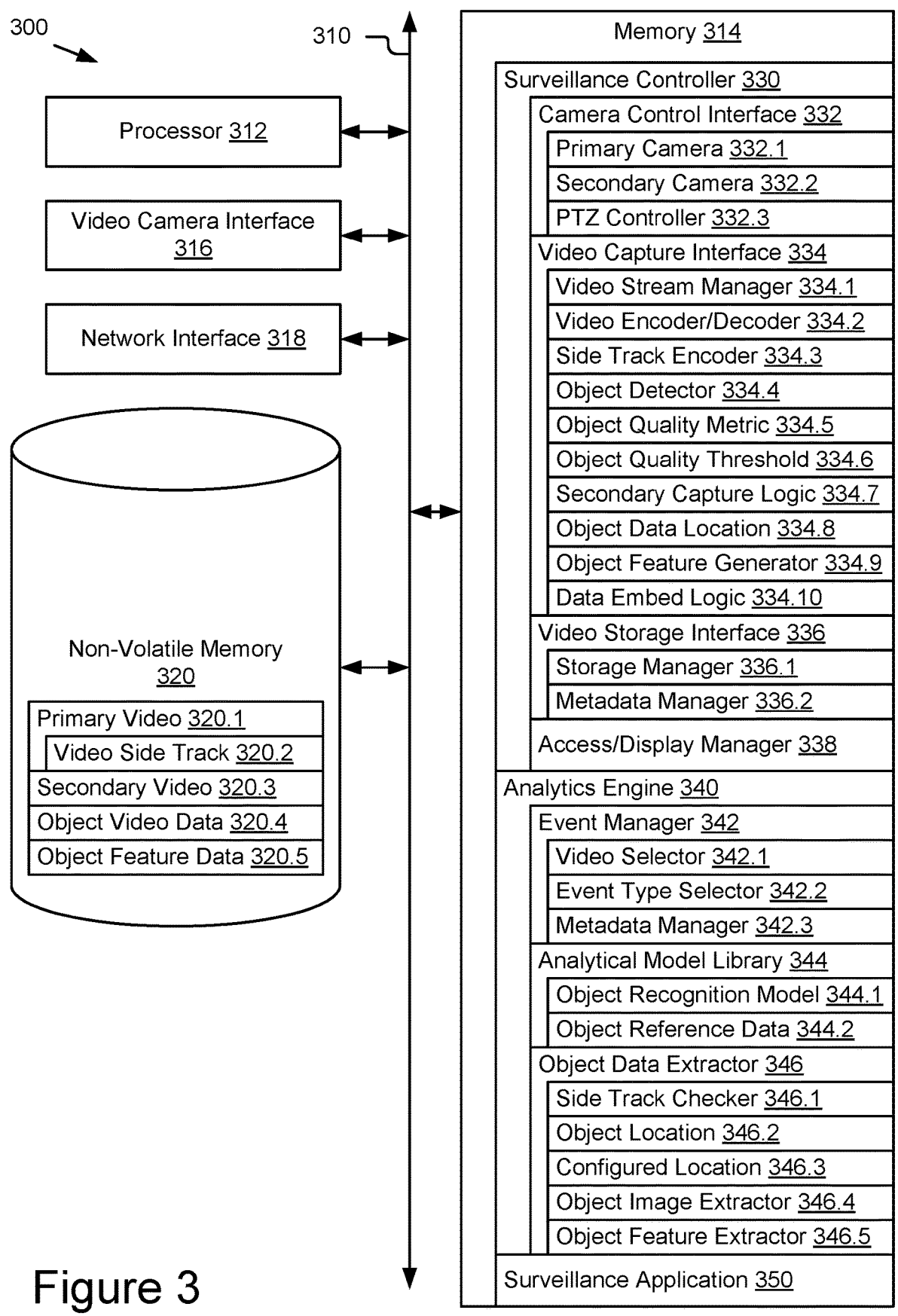
FIG. 3 schematically illustrates some elements of the computer-based surveillance system of FIG. 1.

FIG. 3 schematically shows selected modules of a surveillance system 300 configured for embedding video object data from one video camera into the video stream of another video camera. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of video capture interface 334 and installed in line with a primary video camera to provide secondary object video data and the processing to embed the object data in the primary video stream from that primary camera.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include control signals, commands, or messages for manipulating specific features of one or more cameras. For example, camera control interface 332 may pair or group video cameras that have overlapping fields of view and may allow a detected object to be viewed from multiple perspectives. In some embodiments, a control table for the plurality of video cameras may include a cross-index configured to identify cameras that may serve as primary camera 332.1 and secondary camera 332.2 to one another. For example, each camera entry may include one or more camera identifiers for other cameras that may provide alternate views of objects within that cameras field of view. In some embodiments, secondary camera 332.2 may be specifically assigned as a secondary camera to a particular primary camera 332.1 and may not be configured to function as a primary camera itself. For example, an existing set of video cameras may have one or more secondary cameras installed specifically to provide an alternative view to support improved object recognition and not to provide a primary video stream to an associated network video recorder or user device.

In some embodiments, camera control interface 332 may include a PTZ controller 332.3 for one or more video cameras. For example, each video camera may be equipped with a PTZ control unit and associated motor and/or digital controllers and command interface for moving that video camera from its current position to pan, zoom, and/or tilt to change the field of view. In some embodiments, PTZ controller 332.3 may include a remote controller unit that sends PTZ control commands to adjust camera position and/or zoom in real-time, such as responsive to the detection of an object of interest in the field of view (but not ideally positioned in the field of view). In some embodiments, PTZ controller 332.3 may include a set of configuration settings for auto-tracking or auto-capture functions within the selected video camera. For example, one or more cameras may include an auto-capture feature for detecting objects of interest and then centering and zooming on the detected object. PTZ controller 332.3 may be used to configure the parameters of the auto-capture feature, such as classes of objects (e.g., humans, human faces, vehicles, license plates, etc.) to be captured, PTZ ranges or limits, timing, quality or reliability thresholds, etc. In some embodiments, PTZ controller 332.3 may configured secondary camera 332.2 for using PTZ control to center and zoom on an object detected in the field of view of primary camera 332.1. For example, an object detected in the video data of primary camera 332.1 (by that video camera and/or associated network video recorder) may provide an object class and/or location information in a command signal to secondary camera 332.2 to initiate object detection and/or related PTZ adjustments to provide better quality secondary images of the detected object.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, each video camera configured as a primary video camera may have a dedicated video channel for their respective primary video streams. Video capture interface 334 may be configured to pass each received video stream to video storage interface 336, analytics engine 340, and/or access/display manager 338. For example, received video streams may be buffered by video capture interface before being streamed to video storage interface 336, analytics engine 340, and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components.

In some embodiments, video capture interface 334 may include a video stream manager 336.1 configured to identify and manage the plurality of video streams being received from the cameras. For example, video stream manager 336.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths. For example, the storage path (through video storage interface 336), the display path (through access/display manager 338), and/or the analytics path (through analytics engine 340) may each be configured for specific processing, priority, and timing.

In some embodiments, video stream manager 334.1 may be configured to use encoder/decoder 334.2 to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters. In some embodiments, video encoder/decoder 334.2 may be used to decode primary video data so that secondary object data may be added to or replace some portions of the primary video data before reencoding the primary video data for one or more of the data paths, such as the analytics path. In some embodiments, video encoder/decoder 334.2 may support one or more side tracks for encoding and decoding additional data synchronized to the primary video data. For example, video encoder/decoder 334.2 may include a side track encoder 334.3 configured to encode (and/or decode) audio data, subtitle data, synchronized metadata, and/or other side track data. In some embodiments, side track encoder 334.3 may be configured to encode video image data, such as object video data 320.4 or object feature data 320.5 from secondary camera 332.2 in one or more video side tracks 320.2 of primary video stream 320.1.

In some embodiments, video capture interface 334 may be configured with an object detector 334.4 supporting detection of one or more object classes, such as human faces. For example, object detector 334.4 may operate on captured video data received from a primary video camera to detect whether an object is present in the video data. In some embodiments, object detector 334.4 may include a lightweight object detection model that can be processed in near real-time with the limited processing bandwidth of the video camera and/or associated compute resources. In some embodiments, the object detection model may operate on the video data in the primary video stream and return a flag or class for the object detected, an object quality metric 334.5, object position, and/or object boundary data, such as two horizontal positions and two vertical positions to define a boundary box within the video frame.

In some embodiments, object detector 334.4 may have one or more associated object quality thresholds 334.6 for evaluating the object quality metric for each object detection event. For example, object quality threshold 334.6 may include an object detection threshold, below which the presence of an object is not treated as sufficiently certain to raise an object detection event, such as 50% reliability. Object quality threshold 334.6 may include a recognition quality threshold, defined as the object quality metric corresponding to sufficient quality for an object recognition algorithm, that is a generally a higher quality value than the object detection threshold. In some embodiments, video capture interface 334 may be configured to determine object detection events meeting (equal to or greater than) the object detection threshold but not meeting (less than) the recognition quality threshold for a primary video stream and using this event to initiate the capture and/or embedding of secondary video object data from secondary camera 332.2. For example, object quality metric values between 50% and 80% may trigger the secondary image process for increasing object video quality (ideally better than 80%) to better enable object recognition by analytics engine 340.

Video capture interface 334 may include secondary capture logic 334.7 for managing the process of capturing, extracting, and embedding secondary object data from secondary camera 332.2 in a primary video stream for primary camera 332.1. For example, secondary capture logic 334.7 may be initiated in response to object detector 334.4 determining that the object quality metric value for an object detection in the primary video stream does not meet object quality threshold 334.6 and additional object data may be needed for object recognition. In some embodiments, secondary capture logic 334.7 may initiate secondary camera 332.2 to capture video data for the object detected in the primary video stream. For example, secondary capture logic 334.7 may use camera control interface 332 to initiate an auto-capture process targeting the object of interest and receive the resulting secondary video data. Video capture interface 334 may initiate a secondary object detection process on the secondary video data from secondary camera 332.2. For example, secondary capture logic 334.7 may use object detector 334.3 to detect the same object class in the secondary video data and receive the resulting object quality metric 334.5, object position, and/or object boundary data. In some embodiments, the secondary object detection may be executed by the secondary camera as part of the auto-capture process and the results may be provided to secondary capture logic 334.7. In some embodiments, secondary capture logic 334.7 may evaluate the object quality metric for the secondary video data against object quality threshold 334.6 to determine whether the secondary camera captured object images that are better quality than the original object images in the primary video data. For example, the secondary object quality metric may have to both exceed the primary object quality metric and a recognition quality threshold to be selected by secondary capture logic 334.7 for embedding in the primary video stream.

Secondary capture logic 334.7 may be configured to embed a selected portion of the secondary video data, such as object image data, or corresponding object feature data for the detected object in the primary video stream. In some embodiments, secondary capture logic 334.7 may determine an object data embed location 334.8 in which the secondary object data, such as object image data and/or object feature data, may be inserted into the primary video stream. For example, secondary capture logic 334.7 may be configured to determine a side track or a set of pixels within the video data to enable the secondary object data to be added to the primary video stream in a time position substantially synchronous between the time the video data was captured by the respective cameras. In some embodiments, the set of pixels that define the embed location in the primary video frame may be determined using a fixed set of pixels and location determined through a configuration parameter, such that video capture interface 334, analytics engine 340, and other components accessing the secondary object data may always look in the same pixel set. For example, the fixed set of pixels may represent a block of pixels along the edge or in a corner of the frame or distributed throughout frame in a predictable pattern, similar to a digital watermark. In some embodiments, the set of pixels for the embed location may be dynamically generated relative to the location of the object in the primary video frame. For example, the object video data 320.4 may overwrite some or all of the original object video data in the primary video frame, such as placing the contents of the second object boundary over the original object boundary or in reference to the original object boundary (e.g., 200 pixels up and 200 pixels left from the upper left corner of the original object boundary).

Secondary capture logic 334.7 may be configured to select or determine a subset of video data (e.g., object image data) and/or object feature data based on the secondary video data to embed that requires substantially less data than the primary video data or the complete secondary video data. For example, secondary capture logic 334.7 may select only the secondary video data that includes the object of interest and exclude any background (or other object) image data, object image data separated from the other contents of the secondary video data. In some embodiments, secondary capture logic 334.7 may use an object boundary, such as an object box, returned by object detector 334.4 to select the set of pixels within that boundary from the secondary video data to separate and embed. It some embodiments, secondary capture logic 334.7 may further include object feature generator 334.9 configured to abstract one or more features of the object image data into relevant object parameters, such as object feature vectors, object templates, or object (face) embeddings. For example, a human face object may be abstracted into the set of feature vectors (e.g., numeric representations of relative size, spacing, and orientation of facial features) used to describe (and search) human faces or a sign or license plate may be abstracted into a pattern of edges for character recognition. As with object detector 334.4, the model used by object feature generator 334.9 may be a lightweight face embedding model or template generator matched to the processing resources available to video capture interface 334 for processing the secondary video data in near real-time.

Video capture interface 334 may be configured to embed the object data in the primary video stream using object data embed logic 334.10. For example, responsive to secondary capture logic 334.7 determining the object data to be embedded, such as object video data and/or object feature data, and object data location 334.8, data embed logic 334.10 may selectively replace, overwrite, and/or supplement the original pixel data and/or side track data with secondary pixel data and/or side track data including the object video data and/or object feature data. In some embodiments, data embed logic 334.10 may access each original frame of raw or decoded primary video data for the primary video stream and selectively replace the pixel values for object data location 334.8. For side tracks, data embed logic 334.10 may write to an empty side track, replace the side track data, and/or use an embedding scheme that integrates the object data into the original side track data. In some embodiments, data embed logic 334.10 may use video encoder/decoder 334.2 and/or side track encoder 334.3 to encode the modified video or side track data according to the appropriate codec and other encoding parameters. For example, the resulting primary video stream may fully comply with the video format and be stored and displayed normally by other components without any special handling of the embedded object data. Systems, subsystems, or components that benefit from accessing the secondary object data may process the primary video stream data to extract the secondary object data as described below with regard to analytics engine 340.

Video storage interface 336 may include storage interface protocols and a set of functions, parameters, and data structures for managing storage of video data in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, video storage interface 336 may include a storage manager 336.1 configured to manage video storage space in non-volatile memory 320 in accordance with one or more data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 336 may also include a metadata manager 336.2 to receive and store video metadata as tags or metadata tracks in the video data or in an associated metadata table, file, or similar data structure associated with the corresponding video data objects. In some embodiments, metadata manager 336.2 may be configured to extract secondary object data from primary video data being stored to non-volatile memory 320 and may store the resulting object video data 320.4 and/or object feature data 320.5 in corresponding metadata structures for use by other system components. For example, metadata manager 336.2 may include an object data extractor that operates similar to object data extractor 346 below.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342, analytical model library 344, and object data extractor 346. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include a video selector 342.1 configured to select target video streams or video data sets for analysis. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector 342.2 configured to determine one or more event types to be detected from the selected video data. For example, an analytics configuration may be configured to analyze the selected video stream for a predefined set of motion detection, tripwire detection, object recognition, facial recognition, audio detection, speech recognition, and/or similar video event types. Each event type may map or correspond to an analytical model type, set of parameters, and one or model weights for defining an event detection algorithm stored in analytical model library 344 for use by analytics engine 340 to detect potential video events.

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target object classes (e.g., cars, license plates, equipment, people, etc.), and/or training conditions. Each analytical model may include a set of base equation(s) for the analytical model type, set of target parameters, and one or model weights that determine the event detection algorithm that will be used for the event detection processing. In some embodiments, analytical model library 344 may include at least one object recognition model 344.1. For example, a facial recognition model may apply a set of weighted parameter values representing the relationships among sets of feature vectors for comparison with reference data (such as sets of feature vectors for known faces) and determination of a probabilistic reliability or correlation factor. Analytical model library 344 may include or access object reference data 344.2 for matching detected objects with previously identified (or recognized) reference objects. For example, the facial recognition model may be applied to a reference database of relevant facial images and/or feature sets extracted therefrom to provide facial reference data. In some embodiments, for any given detected object, object recognition model 344.1 may return one or more recognized matches and a corresponding reliability value. For example, the facial recognition model may return one or more known individuals from the reference data and corresponding reliability values, assuming at least one match is found that meets a threshold reliability value. In some embodiments, analytics engine 340 may include or access training services for generating or updating analytical models in analytical model library 344.

Object data extractor 346 may include APIs and functions, parameters, and data structures for extracting secondary object data that has been embedded in primary video data 320.1. For example, primary video data 320.1 from non-volatile memory 320 may include object video data 320.4 and/or object feature data 320.5 embedded in pixel data and/or vide side track data 320.2. Object video data 320.4 and/or object feature data 320.5 may be derived from secondary video data 320.3 that was captured concurrently with primary video data 320.1 by a secondary camera and is no longer available to analytics engine 340. For example, secondary video data 320.3 may have only been stored temporarily in the cameras or associated compute resources during processing by video capture interface 334 and not streamed to video storage interface 336 or other components.

In some embodiments, primary video data 320.1 and/or associated metadata may indicate the presence of embedded secondary object data and/or object data extractor 346 may be configured to check one or more possible object data location to determine whether secondary object data is present. For example, side track checker 346.1 may be configured to check one or more side track locations where supplemental object data could be included in the primary video stream. In some embodiments, object data extractor 346 may use its own object detector (similar to object detector 334.4) to determine an object location 346.2 in the primary video data, which may include the original object video data captured by the primary camera and/or secondary object video data 320.4 embedded in the primary video data 320.1. For example, the object detector may detect only object video data 320.4, where the secondary video data was used to overwrite the original object video, or both the original object video and the secondary object video in a known relationship to one another, such as a pixel distance and orientation from one another. In some embodiments, object feature data 320.5 may be embedded as numeric data that selectively replaces pixel values within the original object video and/or secondary object video. In some embodiments, object data extractor 346 may use a configured location 346.3 for object data. For example, configured location 346.3 may be a predefined set of pixels in the original video frames that have been selectively replaced with the secondary object data.

In some embodiments, object data extractor 346 may include one or more video data masks that may be used by object image extractor 346.4 and/or object feature extractor 346.5 for returning the secondary object data. For example, object image extractor 346.4 may apply an algorithm or mask for extracting object video data 320.4 from the primary video data and/or side track data and passing the reassembled secondary object video for storage and/or processing by object recognition model 344.1. Similarly, object feature extractor 346.5 may include an algorithm or mask for extracting object feature data 320.5 that has been encoded within the primary video data. Note that object feature extractor 346.5 may include logic for locating and extracting feature values embedded in numerical form as supplemental data among the pixels of primary video data 320.1 and is distinct from object feature generator 334.9 that calculates the feature values from the object image data by locating and abstracting the features of interest.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application 350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library 344 for one or more analytics engines 340. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with analytics engine 340 for selecting, training, managing, and using the event detection algorithms configured through the analytics manager. In some embodiments, the analytics manager may interface with access/display manager 338 for accessing and managing one or more analytics engines 340.

Figure 4:
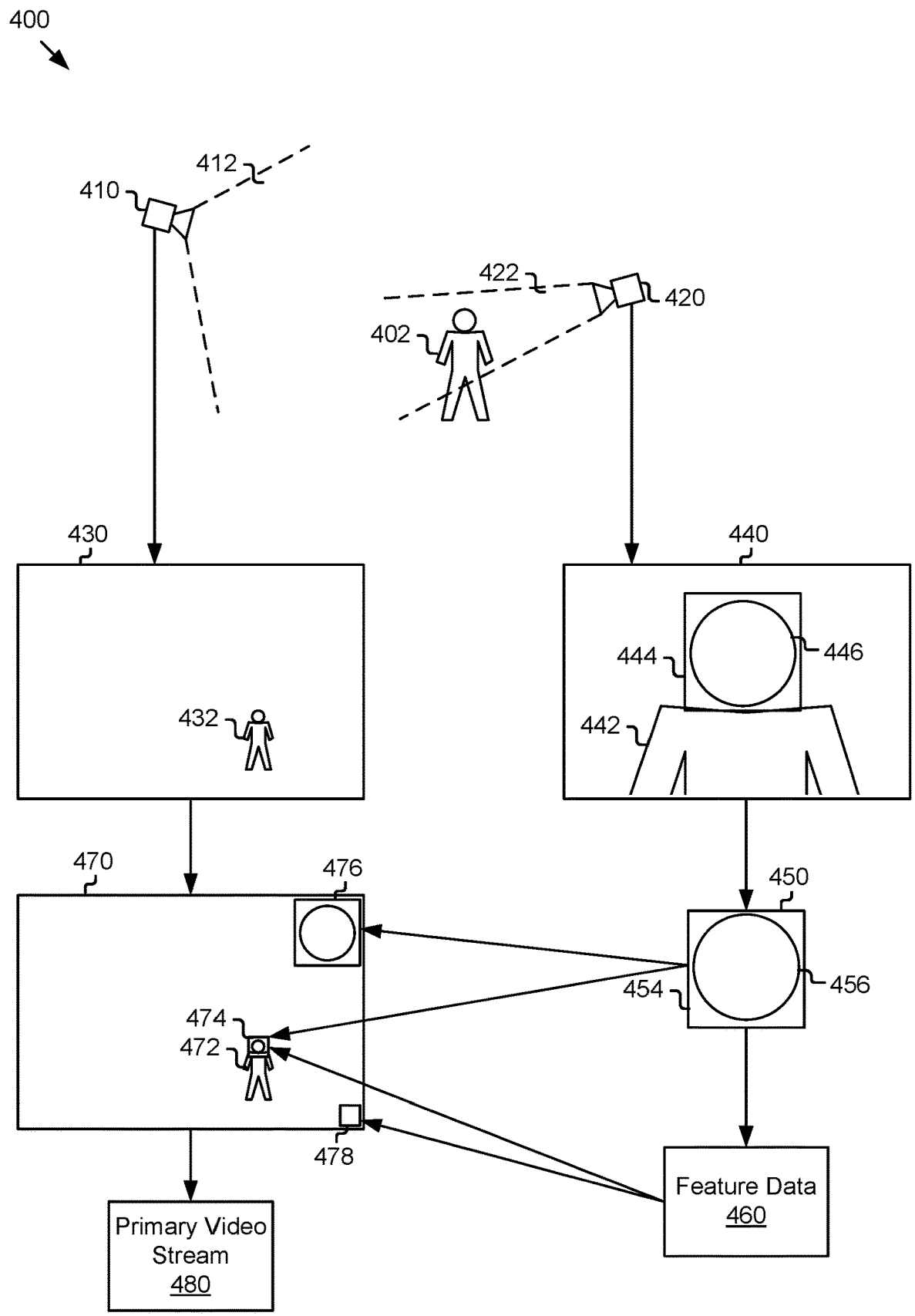
FIG. 4 schematically illustrates the capture of video for an object from two cameras and embedding object video data from the second camera in the video of the first camera.

As shown in FIG. 4, surveillance system 400 may be configured to capture video for an object from two cameras and embed object data from the second camera in the video of the first camera. For example, surveillance system 400 may be configured similarly to the surveillance systems in FIGS. 1-3, with a primary camera 410 and a secondary camera 420 having overlapping fields of view 412 and 422 that include an object, such as person 402. In the example shown, primary camera 410 provides a wide view and secondary camera 420 is more narrowly focused on person 402. Person 402 may have initially been detected when it entered field of view 412 of primary camera 410 and this may have triggered surveillance system 400 to use secondary camera 420 to capture a more focused image of person 402, and more particularly their face, in narrower field of view 422. While the cameras shown are placed on opposite sides of the object, the two cameras may be in close relation to one another, including multiple image sensors or lenses providing two video data streams to the same camera electronics or processing subsystem.

Primary camera 410 may generate video data 430, where person 402 is captured in a relatively small portion of the frame as object 432. By contrast, secondary camera 420 may generate video data 440 that includes a much closer view of person 402 as object 442. In a system configured for facial recognition, secondary video data 440 may be used to detect face 446 as an object of interest and determine an object boundary 446. While the face of person 402 may appear in primary video data 430, it may be too small or otherwise obscured such that facial recognition would be difficult from object 432. Surveillance system 400 may be configured to embed the face data from secondary video data 440 into primary video data 430.

The face image data may be extracted from secondary video data 440 as object video data 450. For example, object boundary 444 may be used to size the extracted image data and substantially exclude the background or non-object content from video data 440. Object video data 450 may include the object of interest, such as face 456, within a much smaller frame 454 having a reduced data size relative to video data 440. Object video data 450 may be embedded in modified primary video data 470. For example, object video data 450 may selectively replace a set of pixels 476, such as a set of pixels defined in configuration parameters for embedding secondary image data. In another example, object video data 450 may replace the original object image data, such as by placing object video data 450 based on a set of pixels 474 overlapping the original object 472.

Object video data 450 from secondary video data 440 may be processed using a feature abstraction algorithm or face template generator to determine a set of feature data 460. Feature data 460 may be embodied in a series of data values that require substantially less data than object video data 450 and can be embedded in modified video data 470 without changing the video data in visually perceptible ways. For example, feature data 460 may be hidden in selectively replaced pixel values that are distributed such that they do not compromise the overall visual impression. In the example shown, feature data 460 (or other object feature data) may be embedded in modified video data 470 in a set of pixels 478 in a predefined location and/or a set of pixels 474 associated with original object 472. Modified video data 470 may be encoded in a primary video stream 480 from primary video camera 410 for communication to a network video recorder or other components of storage system 400 for storage and further processing.

Figure 5:
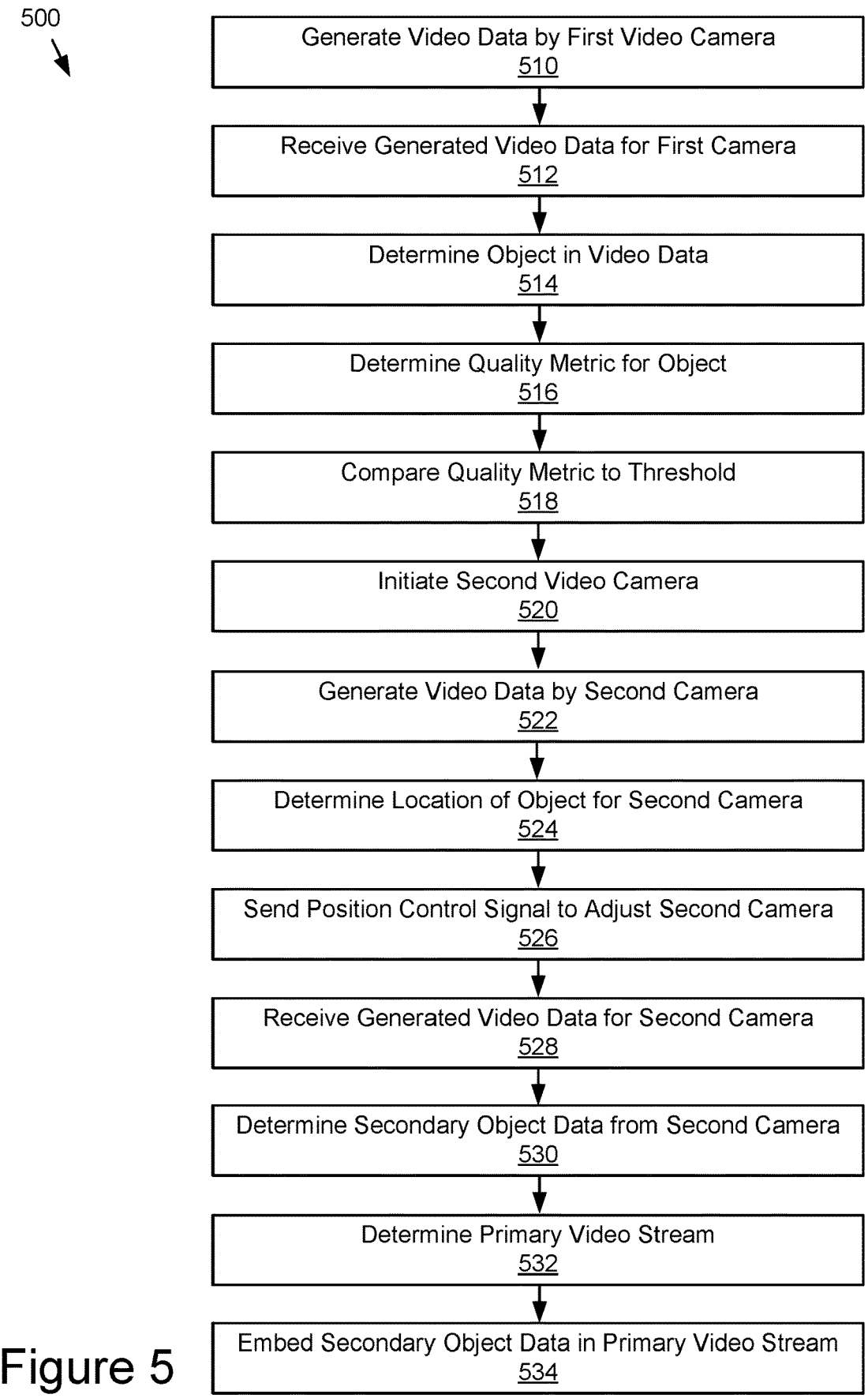
FIG. 5 is a flowchart of an example method of embedding object image data from a second camera in the video stream of a first camera.

As shown in FIG. 5, surveillance system 300 may be operated according to an example method for embedding secondary object data from a second camera in the video stream of a first camera, i.e., according to method 500 illustrated by blocks 510-534 in FIG. 5.

At block 510, video data may be generated by a first video camera. For example, the video camera may activate to capture video continuously or responsive to a trigger condition.

At block 512, video data generated by the first video camera may be received for processing and storage. For example, the video camera may include or communicate with a video capture interface configured to receive video data from the first video camera and detect events for the system to respond to.

At block 514, an object may be determined to be present in the video data. For example, an object detector may identify image data corresponding to an object of interest.

At block 516, a quality metric may be determined for the detected object. For example, the object detector may determine an image quality metric corresponding to the probability that the image of the object is actually the object of interest.

At block 518, the quality metric may be compared to a quality threshold value. For example, the object detector may include an image quality threshold corresponding to the fitness of the image for subsequent object recognition processing. If the quality metric does not meet the quality threshold for the object image, then additional object video data may be needed and a secondary capture process may be initiated.

At block 520, a second video camera may be initiated to capture video data of the object of interest from an alternate view. For example, the video capture interface may initiate data capture or access video already being generated by a second video camera.

At block 522, video data may be generated or captured by the second video camera. For example, responsive to the video capture interface, the second video camera may activate.

At block 524, a location of the object in the field of view of the second video camera may be determined. For example, the second video camera may use information from the video capture interface regarding the object of interest to perform an object detection on the video data the second camera is generating.

At block 526, a position control signal may be sent to the second video camera to adjust its position and/or zoom. For example, the video capture interface may use a camera control interface to send PTZ commands to the second video camera to center and zoom on the object of interest.

At block 528, video data generated by the second video camera may be received for processing and embedding in the video data from the first video camera. For example, the second video camera may include or communicate with a video capture interface configured to receive video data from the second video camera for use in supplementing the object data in the primary video stream of the first video camera.

At block 530, secondary object data may be determined from the second camera video data. For example, an object detector may detect and determine an object boundary for the object of interest in the video data of the second video camera and/or abstract feature data related to the object of interest from that video data.

At block 530, the primary video stream of the first video camera may be determined. For example, the video capture interface may buffer the unencoded video data from the first video camera prior to encoding and transmitting it as a video stream for storage and further analysis, such as object recognition processing.

At block 534, secondary object data from the second video camera may be embedded in the primary video stream. For example, the video capture interface may selectively replace some of the pixels or side track data in the video data for the primary video stream with secondary object data determined at block 530.

Figure 6:
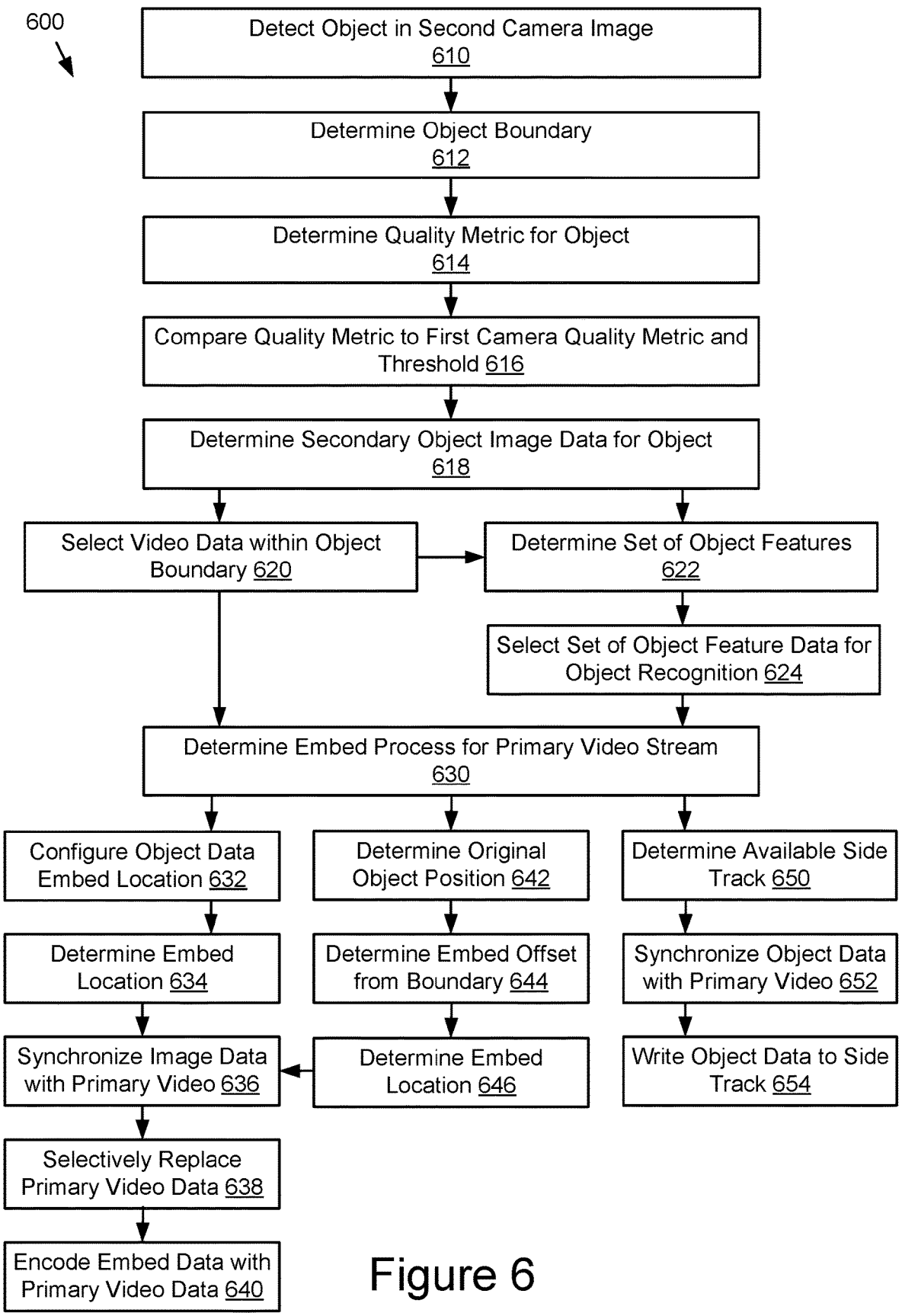
FIG. 6 is a flowchart of another example method of embedding object image data from a second camera in the video stream of a first camera.

As shown in FIG. 6, surveillance system 300 may be operated according to an example method for embedding secondary object data from a second camera in the video stream of a first camera, i.e., according to method 600 illustrated by blocks 610-654 in FIG. 6. In some embodiments, method 600 may operate in conjunction with one or more blocks of method 500 in FIG. 5.

At block 610, an object is detected in a second camera image. For example, a secondary video camera may capture video data including image data for an object of interest and an object detector may determine the presence and location of the object in the video data.

At block 612, an object boundary may be determined for the detected object. For example, the object detector may include boundary detection and define an object image data frame within the broader video image data and frame.

At block 614, a quality metric may be determined for the image data of the detected object. For example, the object detector may return at least one image quality metric value based on the probability and/or confidence level that the object has been correctly detected from the video data.

At block 616, the quality metric may be compared to the corresponding quality metric from object detection in the first camera video data and/or an object quality threshold for further processing. For example, the video capture interface may evaluate whether the quality metric value for the second camera image exceeds the quality metric value for the object in the original video data from the first camera and the quality metric threshold for subsequent processes, such as an object recognition threshold value.

At block 618, secondary object image data for the object may be determined from the second camera video data. For example, the video capture interface may evaluate whether the object image data is sufficiently small to be embedded in the primary video stream and/or a set of object feature data may be abstracted from the secondary video data for embedding.

At block 620, a subset of video data corresponding to the detected data object may be selected using the object boundary. For example, the video capture interface may separate the pixels within the object boundary determined by the object detector and use the selected object image data for subsequent embedding.

At block 622, a set of object features may be determined from the second camera video data. For example, the video capture interface may execute one or more object feature abstraction algorithms or template generators to generate a set of object feature data from the second camera video data and/or the object video data determined at block 620.

At block 624, a set of object feature data may be selected for use in object recognition. For example, the video capture interface may use a set of features determined at block 622 for subsequent embedding.

At block 630, an embed process may be determined for the primary video stream. For example, the video capture interface may evaluate the size of the object image data and/or set of object feature data and the embedding options and locations in the primary video stream to determine what secondary object data may be embedded in which locations.

At block 632, an object data embed location may be configured for the primary video stream. For example, a configuration file, table, or other set of configuration parameters may define one or more acceptable and predefined embed locations within the video data frame of the primary video stream.

At block 634, the secondary object data embed location may be determined. For example, the video capture interface may select one or more data embed locations based on the size of the locations and their compatibility (dimensions, pixel count, position, etc.) with the secondary object data.

At block 636, the image data including the secondary object data may be synchronized with the primary video stream. For example, the video capture interface may use timestamps or other time indicators from the respective video cameras and the video data to align the secondary object data from one capture time with the primary video data of substantially the same capture time.

At block 638, primary video data may be selectively replaced with pixel data including the secondary object data. For example, the video capture interface may selectively replace pixels in the original image data in the embed location(s) determined at block 634 to include the secondary object data.

At block 640, the modified primary video data, including the embedded pixel data with the secondary object data, may be encoded for transfer, storage, and/or further processing. For example, the video capture interface may encode the modified primary video data using the appropriate codec and corresponding parameters for the primary video channel for the network video recorder or other system components.

At block 642, the object position in the original video data from the first video camera may be determined. For example, the object detector for the original video data may have determined an object boundary or other object position information within the video data frames.

At block 644, an embed offset from the boundary may be determined. For example, the video capture interface may use the original object image size, the secondary object data size, and configuration parameters to determine a position offset (including degree of object overlap or replacement) for the set of pixels for the secondary object data relative to the original object boundary determined at block 642.

At block 646, the secondary object data embed location may be determined. For example, the video capture interface may select one or more data embed locations based on the original object position and the embed offset and proceed with image data embedding at block 636.

At block 650, an available side track may be determined. For example, the video capture interface may select a side track that is empty, includes non-essential data, or can accommodate additional data without violating the video format for the primary video stream.

At block 652, the side track data including the secondary object data may be synchronized with the primary video stream. For example, the video capture interface may use timestamps or other time indicators from the respective video cameras and the video data to align the secondary object data from one capture time with the primary video data of substantially the same capture time.

At block 654, the secondary object data may be written into the determined side track. For example, the video capture interface may write the secondary object data, object video data and/or object feature data, into the side track determined at block 650 with encoding compatible with the primary video stream.

Figure 7:
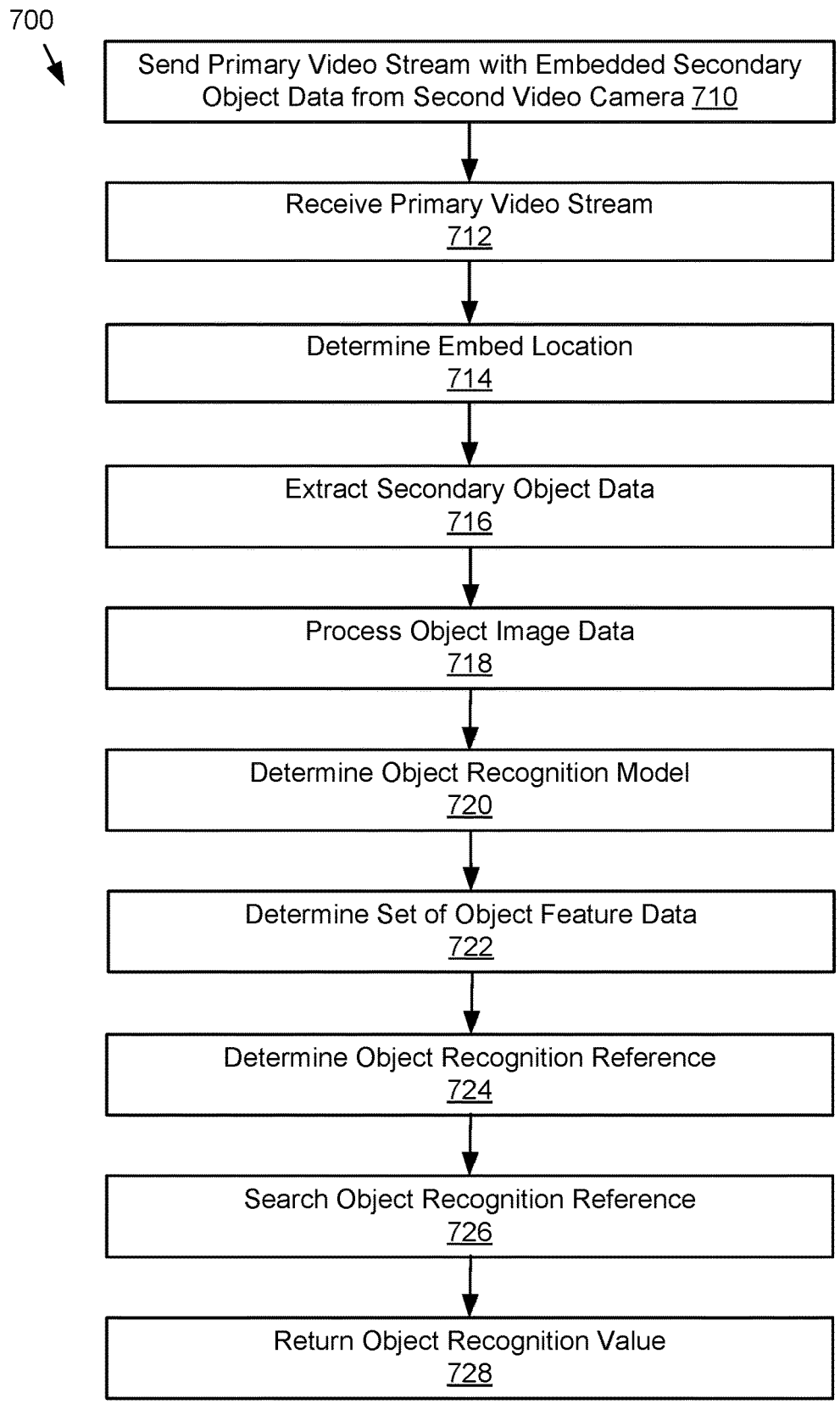
FIG. 7 is a flowchart of an example method of processing object image data embedded in a primary video stream for object recognition.

As shown in FIG. 7, surveillance system 300 may be operated according to an example method for processing secondary object data embedded in a primary video stream for object recognition, i.e., according to method 700 illustrated by blocks 710-728 in FIG. 7.

At block 710, the primary video stream with the embedded secondary object data from the second video camera may be sent to one or more storage or processing components. For example, after the video capture interface embeds the secondary object data in the primary video stream, it may be sent to video storage, video display, and/or one or more analytics engines, including an analytics engine configured for object recognition.

At block 712, the primary video stream may be received. For example, an analytics engine may receive the primary video stream directly and/o retrieve the primary video stream data from video storage.

At block 714, an embed location for the secondary object data may be determined. For example, the analytics engine may include an object data extractor configured to determine the embed location based on configuration parameters and/or object detection.

At block 716, secondary object data may be extracted from the primary video stream. For example, the object data extractor may extract object image data and/or object feature data from the embed location(s) identified at block 714. If object feature data is extracted, further processing of object image data at block 718 may be unnecessary.

At block 718, object image data may be processed. For example, the object data extractor may use data detection and/or feature abstractors to further process the object image data corresponding to one or more object recognition models.

At block 720, an object recognition model may be determined. For example, the analytics engine may select an object recognition model from a model library based on an object class and other parameters from the primary video stream, such as location, light conditions, etc. If object feature data was extracted at block 716, the object recognition model may be predetermined based on the object recognition model used to generate the object feature data that was embedded.

At block 722, a set of object feature data may be determined for object recognition based on the object recognition model. For example, the object data extractor may select a set or subset of object feature values from extracted object feature data and/or the processing of object image data at block 718.

At block 724, an object recognition reference set may be determined. For example, the analytics engine may select a set of object recognition references corresponding to known objects, such as a database of object feature sets that have been previously identified.

At block 726, the object recognition reference may be searched for recognition matches. For example, the object recognition model may be applied to the set of object feature data from the secondary object data and the object recognition reference to determine objects matching within a certain probability or reliability threshold.

At block 728, an object recognition value may be returned based on the search. For example, the object recognition value may include a set of one or more identified objects with their object identifier (such as the name of a matching person) and a reliability score for the match. In the event that no match is found meeting the base reliability threshold, a no matches found result or corresponding error message may be returned.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
    a first video camera;
    a second video camera, wherein the second video camera is configured to provide an alternative view of an object in a field of view of the first video camera; and
    a controller configured to:
        receive video data from the first video camera;
        receive video data from the second video camera;
        determine a first image of an object in the video data from the first video camera;
        determine, based on the video data from the first video camera, a primary video stream;
        determine, based on a second image of the object from the second video camera, secondary object data;
        determine, based on the secondary object data, a set of object feature data for use in object recognition;
        embed the set of object feature data in the primary video stream; and
        send, after embedding the set of object feature data, the primary video stream to an analytics engine for processing the set of object feature data.

2. The system of claim 1, wherein the controller is further configured to: determine, for the first image of the object, an object quality metric; and
    initiate, responsive to the object quality metric for the first image of the object failing an object quality threshold, the second video camera to capture the video data from the second video camera.

3. The system of claim 2, wherein the controller is further configured to:
    determine a location of the object in a field of view of the second video camera; and
    send, responsive to the object quality metric for the first image of the object failing the object quality threshold, a pan-tilt-zoom position control signal to the second video camera to adjust the alternative view of the object for the second image of the object.

4. The system of claim 1, wherein the controller is further configured to:

determine, in the video data from the second video camera, an object boundary for the object; and select, based on the object boundary for the object in the video data from the second video camera, the secondary object data to include object image data within the object boundary.

5. The system of claim 1, wherein:

the controller is further configured to communicate with the analytics engine over a network; and sending, from the controller to the analytics engine, the primary video stream with the embedded set of object feature data is over the network.

6. The system of claim 1, wherein:

the object is a human face;

the set of object feature data includes a set of feature vectors from the human face in the video data from the second video camera; and processing the set of object feature data includes using a facial recognition model and the set of feature vectors to search facial reference data for recognition of the human face.

7. The system of claim 1, wherein the controller is further configured to:

determine, in the video data from the first video camera, an object boundary for the object;

determine, in the video data from the first video camera, an embed location for the set of object feature data relative to the object boundary; and encode, in the primary video stream, the set of object feature data in the embed location within the video data from the first video camera.

8. The system of claim 1, wherein the controller is further configured to:

configure an object data embed location for embedding the set of object feature data;

determine, in the video data from the first video camera and based on the configured object data embed location, an embed location for the set of object feature data; and selectively replace, in the embed location, video data from the first video camera with the set of object feature data.

9. The system of claim 1, wherein the controller is further configured to:

process, using a feature abstraction algorithm, the secondary object data to determine the set of object feature data; and selectively replace a set of pixels in the primary video stream with a series of data values corresponding to the set of object feature data to embed the set of object feature data.

10. The system of claim 1, further comprising the analytics engine, wherein:

the controller is embedded in at least one of:

the first video camera; and the second video camera; and the analytics engine is configured to:

receive the primary video stream;

determine, in the primary video stream, an embed location for the set of object feature data;

extract the set of object feature data from the embed location;

search, based on the set of object feature data, object reference data for recognition of the object; and return an object recognition value for the object.

11. A computer-implemented method, comprising:

receiving first video data from a first video camera;

determining a first image of an object in the first video data;

receiving second video data from a second video camera, wherein the second video camera is configured to provide an alternative view of the object in a field of view of the first video camera;

determining, based on the first video data, a primary video stream;

determining, based on a second image of the object from the second video camera, secondary object data;

determining, based on the secondary object data, a set of object feature data for use in object recognition;

embedding the set of object feature data, in the primary video stream; and sending, after embedding the set of object feature data, the primary video stream to an analytics engine for processing the secondary object data.

12. The computer-implemented method of claim 11, further comprising:

determining, for the first image of the object, an object quality metric; and initiating, responsive to the object quality metric for the first image of the object failing an object quality threshold, the second video camera to capture the second video data.

13. The computer-implemented method of claim 12, further comprising:

determining a location of the object in a field of view of the second video camera; and sending, responsive to the object quality metric for the first image of the object failing the object quality threshold, a pan-tilt-zoom position control signal to the second video camera to adjust the alternative view of the object for the second image of the object.

14. The computer-implemented method of claim 11, further comprising:

determining, in the second video data, an object boundary for the object; and selecting, based on the object boundary for the object in the second video data, the secondary object data to include object image data within the object boundary.

15. The computer-implemented method of claim 11, wherein sending, to the analytics engine, the primary video stream with the embedded set of object feature data is over a network.

16. The computer-implemented method of claim 11, wherein:

the object is a human face;

the set of object feature data includes a set of feature vectors from the human face in the second video data; and processing the set of object feature data includes using a facial recognition model and the set of feature vectors to search facial reference data for recognition of the human face.

17. The computer-implemented method of claim 11, further comprising:

determining, in the first video data, an object boundary for the object;

determining, in the first video data, an embed location for the set of object feature data relative to the object boundary; and encoding, in the primary video stream, the set of object feature data in the embed location with the first video data.

18. The computer-implemented method of claim 11, further comprising:

configuring an object data embed location for embedding the set of object feature data;

determining, in the first video data and based on the configured object data embed location, an embed location for the set of object feature data; and selectively replacing, in the embed location, first video data with the set of object feature data.

19. The computer-implemented method of claim 11, further comprising:

receiving the primary video stream;

determining an embed location for the set of object feature data in the primary video stream;

extracting the set of object feature data from the embed location;

searching, based on the set of object feature data, object reference data for recognition of the object; and returning an object recognition value for the object.

20. A storage system, comprising:

a first video camera;

a second video camera, wherein the second video camera is configured to provide an alternative view of an object in a field of view of the first video camera;

a processor;

a memory;

means for receiving first video data from the first video camera;

means for determining a first image of an object in the first video data;

means for receiving second video data from the second video camera;

means for determining, based on the first video data, a primary video stream;

means for determining, based on a second image of the object from the second video camera, secondary object data;

means for determining, based on the secondary object data, a set of object feature data for use in object recognition;

means for embedding the set of object feature data in the primary video stream; and means for sending, after embedding the set of object feature data, the primary video stream to an analytics engine for processing the secondary object data.

* * * * *